Aug. 24, 1943.  L. H. KENNON  2,327,600
VALVE ASSEMBLY
Filed March 29, 1941
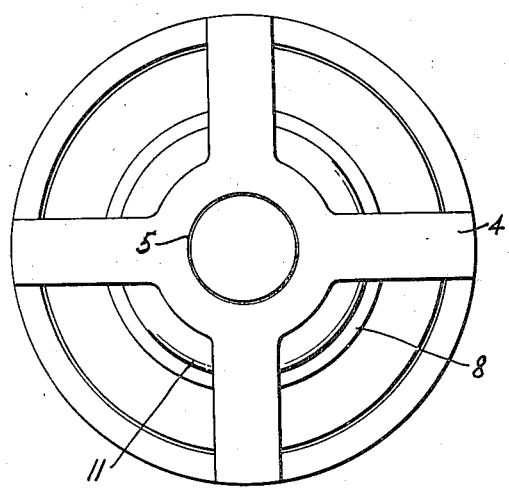
Fig.2.
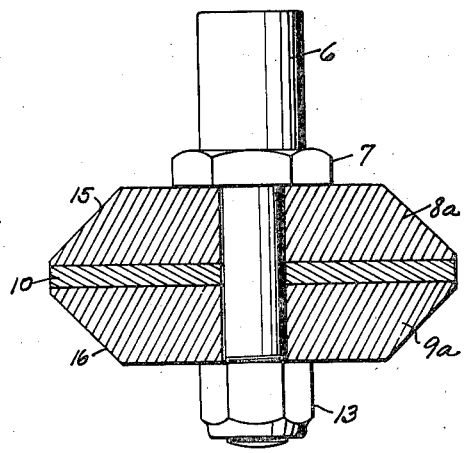
Fig.3.
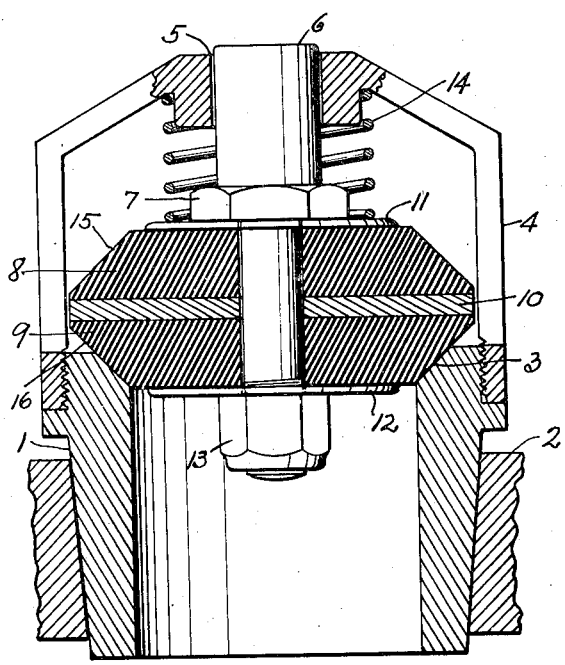
Fig.1.
Fig.4.
Inventor
LOUIS H. KENNON
By
E. V. Hardway,
Attorney Patented Aug. 24, 1943

2,327,600

UNITED STATES PATENT OFFICE 2,327,600

VALVE ASSEMBLY

Louis H. Kennon, Houston, Tex.

Application March 29, 1941, Serial No. 385,841

1 Claim. (Cl. 251—144)

This invention relates to a valve assembly.

An object of the invention is to provide an assembly of the character described which embodies a novel type of valve which is so constructed as to offer a minimum of resistance to the liquid upon opening movement of the valve.

Another object of the invention is to provide, in an assembly of the character described, a valve having two annular tapering faces, one of said faces being tapered to fit the valve seat and the other face being tapered so as to minimize the resistance of the liquid to the valve upon opening movement of the valve.

Another novel feature resides in the provision of a valve having two similar interchangeable parts so that should one of the parts become worn the two parts may be interchanged, or reversed, thus in effect providing a new valve.

A further feature of the invention resides in a valve of the character described having a reenforcing wear plate between the interchangeable parts which serves to reenforce said parts as well as to minimize wear on the margin of the valve due to friction with the valve cage.

With the above and other objects in view the invention has particular relation to certain novel features of construction, arrangement of parts and use, examples of which are given in this specification and illustrated in the accompanying drawing, wherein:

Figure 1 shows a vertical sectional view of the assembly.

Figure 2 shows a plan view thereof with the coil spring dispensed with.

Figure 3 shows a vertical sectional view of another embodiment, and

Figure 4 shows a vertical sectional view of still another embodiment.

Referring now more particularly to the drawing wherein like numerals of reference designate the same parts in each of the figures, the numeral 1 designates a tubular valve seat which may be fitted through an opening in a support 2 such as a pump partition. One end of the seat 1 is formed with a flared seating face 3 on which the valve seats when closed.

Screwed onto the valve seat 1 there is a valve cage 4 having a bearing 5 which is co-axial with the seat. A valve stem 6 works in the bearing 5 and is formed with an enlarged polygonal section 7, formed integrally therewith and beneath which the stem is reduced in diameter.

In the form shown in Figure 1 there are two similar valve discs 8 and 9 formed of hard rubber or other relatively hard composition material. These are fitted over the reduced lower end of the stem and between them there is a circular metal plate 10 of a transverse diameter not less than the maximum transverse diameter of the discs.

There are the thin circular clamp plates 11, 12 fitted onto the stems on opposite sides of the respective valve discs 8 and 9, as shown in Figure 1. The plate 11 abuts the enlarged section 7 of the stem and the free end of the stem is threaded to receive a clamp nut 13 which clamps the plate 12 between it and the disc 9.

There is a coil spring 14 surrounding the stem 6 and interposed between the cage and the plate 11 and which normally urges the valve toward closed position. This spring 14 may be dispensed with as indicated in Figure 2.

The valve discs 8 and 9 are similar in size and shape having annular tapering faces 15, 16. These faces converge upwardly and downwardly, respectively, towards the axis of the stem. The face 16 corresponds in taper to the taper of the seating face 3 and fits closely thereon when the valve is closed. The face 15 will minimize the resistance of the liquid upon opening movement of the valve, the assembly, in that respect, acting similar to a ball valve. The metal plate between the composition valve discs 8 and 9 will take the wear incident to the friction of the valve with the cage thus minimizing the wear on the margin of the composition valve discs.

The disc 9 which seats against the valve seat will be held very firm and unyielding by said reenforcing plate 10.

In the embodiment illustrated in Figure 3 the valve discs 8ª, 9ª are formed of metal and hence the reenforcing plates 11 and 12 are dispensed with in this embodiment. In the embodiment illustrated in Figure 4, the valve discs 8b and 9b are formed of metal and are somewhat thicker than the corresponding discs shown in Figure 3 and reenforcing plate 10 is dispensed with. In all respects than those above noted the forms shown in Figures 3 and 4 are the same as that shown in Figure 1.

In each of the forms the valve discs are interchangeable; that is, when the disc contacting with the valve seat becomes worn or develops a leak, the two discs may be interchanged and the valve thus in effect renewed.

The drawing and description are illustrative merely while the broad principle of the invention will be defined by the appended claim.

What I claim is:

In a valve assembly having a tapering seat and valve cage having valve guiding surfaces, a valve composed of a metal plate, two similar discs on opposite sides of the plate and formed of hard composition material, said discs and plate being of the same transverse diameter, so that the metal plate will contact the guiding surfaces of the cage to protect the margins of the discs from wear, means including a stem for clamping the disc and plate assembly together as a unit, the opposite sides of the valve having plane, parallel surfaces and having similar annular, marginal, tapering faces which converge outwardly from the stem toward each other and which are shaped to selectively fit said tapering seat.

LOUIS H. KENNON.